United States Patent [19]

Alie et al.

[11] Patent Number: 4,896,709

[45] Date of Patent: * Jan. 30, 1990

[54] PNEUMATIC TIRE INCLUDING SQUARE WOVEN BEAD REINFORCING LAYERS

[75] Inventors: Jean-Claude Alie, Bastogne, Belgium; Romain Geisen, Strassen, Luxembourg; André Lamock, Fauvillers, Belgium; William J. Villamizar, Cruchten, Luxembourg

[73] Assignee: The Goodyear Tire & Rubber Company, Akron, Ohio

[ * ] Notice: The portion of the term of this patent subsequent to Feb. 23, 2005 has been disclaimed.

[21] Appl. No.: 157,561

[22] Filed: Feb. 19, 1988

Related U.S. Application Data

[63] Continuation-in-part of Ser. No. 56,073, Jun. 1, 1987, Pat. No. 4,726,408.

[51] Int. Cl.$^4$ .............................................. B60C 15/06
[52] U.S. Cl. .................................... 152/543; 152/546
[58] Field of Search ............... 152/539, 541, 542, 543, 152/546, 547, 548, 552, 553, 554, 555

[56] References Cited

U.S. PATENT DOCUMENTS

| | | | |
|---|---|---|---|
| 2,971,553 | 2/1961 | Woodall | 152/541 |
| 3,638,705 | 2/1972 | Devienne et al. | 152/546 X |
| 4,023,608 | 5/1977 | Meiss | 152/547 X |
| 4,024,901 | 5/1977 | Poque | 152/555 X |
| 4,366,851 | 1/1983 | Makino et al. | 152/554 X |
| 4,398,584 | 8/1983 | Tansei et al. | 152/546 X |
| 4,508,152 | 4/1985 | Sano et al. | |
| 4,726,408 | 2/1988 | Alie et al. | 152/546 X |

FOREIGN PATENT DOCUMENTS

| | | |
|---|---|---|
| 0202925 | 11/1986 | European Pat. Off. . |
| 0206679 | 12/1986 | European Pat. Off. . |
| 0221834 | 5/1987 | European Pat. Off. . |
| 1471105 | 1/1967 | France . |
| 1600345 | 7/1970 | France . |
| 0148603 | 11/1980 | Japan . |
| 1139086 | 1/1969 | United Kingdom . |
| 2000732 | 1/1979 | United Kingdom . |
| 1575027 | 9/1980 | United Kingdom . |
| 2065573 | 7/1981 | United Kingdom . |
| 2126502 | 5/1982 | United Kingdom . |

Primary Examiner—Robert A. Dawson
Assistant Examiner—Geoffrey L. Knable
Attorney, Agent, or Firm—R. J. Slattery, III

[57] ABSTRACT

The invention relates to a pneumatic radial carcass type tire for heavy duty use having an improved reinforcing structure for the bead region. In a tire comprising a four ply radial carcass (1), the two bead regions are each reinforced by a bead core (2) and an axially inner (6) and an axially outer (7) textile reinforcing layer and a rubber apex strip (8). As compared to the prior art, the relatively low rubber apex strip (8) and the resulting low separation point between the first (3) and second (4) set of carcass plies reduces the sheer stresses between these carcass plies while the specific arrangement of the axially inner (6) and axially outer (7) textile reinforcing layers, retains the required stiffness in the bead region (5). In a preferred embodiment of the invention the axially inner (6) and axially outer (7) textile reinforcing layers comprise square woven fabric which help towards reducing the ply waviness of both the reinforcing layers (6,7) and the carcass plies (3,4). A particular durable and uniform bead region (5) is thus obtained.

15 Claims, 3 Drawing Sheets

PNEUMATIC TIRE INCLUDING SQUARE WOVEN BEAD REINFORCING LAYERS

This is a continuation in part of U.S. patent application, Ser. No. 056,073 filed on June 1, 1987, now U.S. Pat. No. 4,726,408.

BACKGROUND OF THE INVENTION

This invention relates generally to pneumatic tires and in particular to pneumatic tires for heavy duty use comprising a radial carcass and two bead regions each reinforced by a bead core whereby the carcass comprises two sets of at least two textile plies each, anchored around the bead core, the plies of the first set being wrapped around the bead core from the inside to the outside of the tire and the plies of the second set being wrapped around the bead core from the outside to the inside of the tire and whereby the bead regions each comprise an axially inner and an axially outer textile reinforcing layer and a rubber apex strip of a substantially triangular cross-section extending radially outwardly from the bead core, the axially inner and outer textile reinforcing layer being respectfully disposed axially inside and outside of said first and second sets of carcass plies along the radial extent of the rubber apex strip, the first and second sets of carcass plies being separated from one another only below a separation point at the apex of the rubber apex strip.

Radial carcass tires for heavy duty use are frequently used under heavy load conditions which place the components within a tire under severe stress. The bead regions of such tires are particularly subject to large deformations caused by flexing of the sidewalls which can produce sheer stresses between the carcass plies, buildup of heat in the tire and subsequent separation failure.

The applicants have discovered a tire construction with particularly durable bead regions which reduces the sheer stresses between the carcass plies. The pneumatic tire of the present invention is characterized in that the height of the radially outermost end of the rubber apex strip is located between 0.15 and 0.2 times the height of the tire cross-section, and in that the ply endings of the first set of carcass plies are located at a height which is lower than the height of the radially outermost end of the rubber apex strip, and in that the height of the radially outermost edge of the axially inner textile reinforcing layer is greater than the height of the radially outermost edge of the axially outer textile reinforcing layer, the height of the radially outermost edge of the axially inner textile reinforcing layer being located between 0.25 and 0.45 times the height of the tire cross-section and the height of the radially outermost edge of the axially outer textile reinforcing layer being located between 0.2 and 0.35 times the height of the tire cross-section.

The construction according to the present invention provides a separation point between the first and second set of carcass plies which is situated outside the flexing zone of the tire. The separation point between the first and second set of carcass plies is determined by the height of the radially outermost end of the rubber apex strip. Since the first and second set of carcass plies follow the same path in the flexing zone and separate from one another only in the area protected by the axially inner and axially outer textile reinforcing layers, the sheer stresses between the first and second set of carcass plies are reduced.

The axially inner and axially outer textile reinforcing layers are disposed such that the required stiffness gradient in the bead region is retained, the stiffness decreasing gradually radially outwardly from the radially outermost end of the rubber apex strip into the flexing zone of the tire.

In a preferred embodiment of the invention, the axially inner and axially outer textile reinforcing layers comprise square woven fabric which help towards reducing the ply waviness of both the reinforcing layers and the carcass plies.

The textile reinforcing layers are generally composed of one or more textile plies having parallel cords making substantially the same angle with the mid-circumferential plane of the tire. During the first stage of the tire building process, these plies are typically applied onto the carcass band on a flat building drum, and subsequently during the tire shaping stage, the building drum is made to expand to conform the tire casing to its final toroidal shape. During this expansion, the textile reinforcing plies in the bead region undergo a displacement generally referred to as pantographing. However, depending on the construction of the tire and on the building equipment that is used, such pantographing may not be uniform. The non-uniform displacement of the reinforcing plies may in turn affect the uniform spacing between the carcass plies in the bead area thereby resulting in what is generally referred to as ply waviness.

The tire construction of the preferred embodiment of the present invention, using axially inner and axially outer textile reinforcing layers comprising a square woven fabric, reduces the waviness of the reinforcing layers and the carcass plies and therefore improves the performance of the tire.

BRIEF DESCRIPTION OF THE DRAWINGS

The invention will now be described with reference to the accompanying drawings in which.

DESCRIPTION OF THE INVENTION

Throughout the specification the terms "axial" and "axially" relate to displacements along the axis of rotation of the tire, and the terms "radial" and "radially" refer to displacements in a plane perpendicular to the axis of rotation of the tire. The terms "axially inner" and "axially outer" refer to axial positions relative to the mid-circumferential plane M—M. The mid-circumferential plane M—M is a plane normal to the axis of rotation and which is located midway between the bead cores 2.

Figure 1:
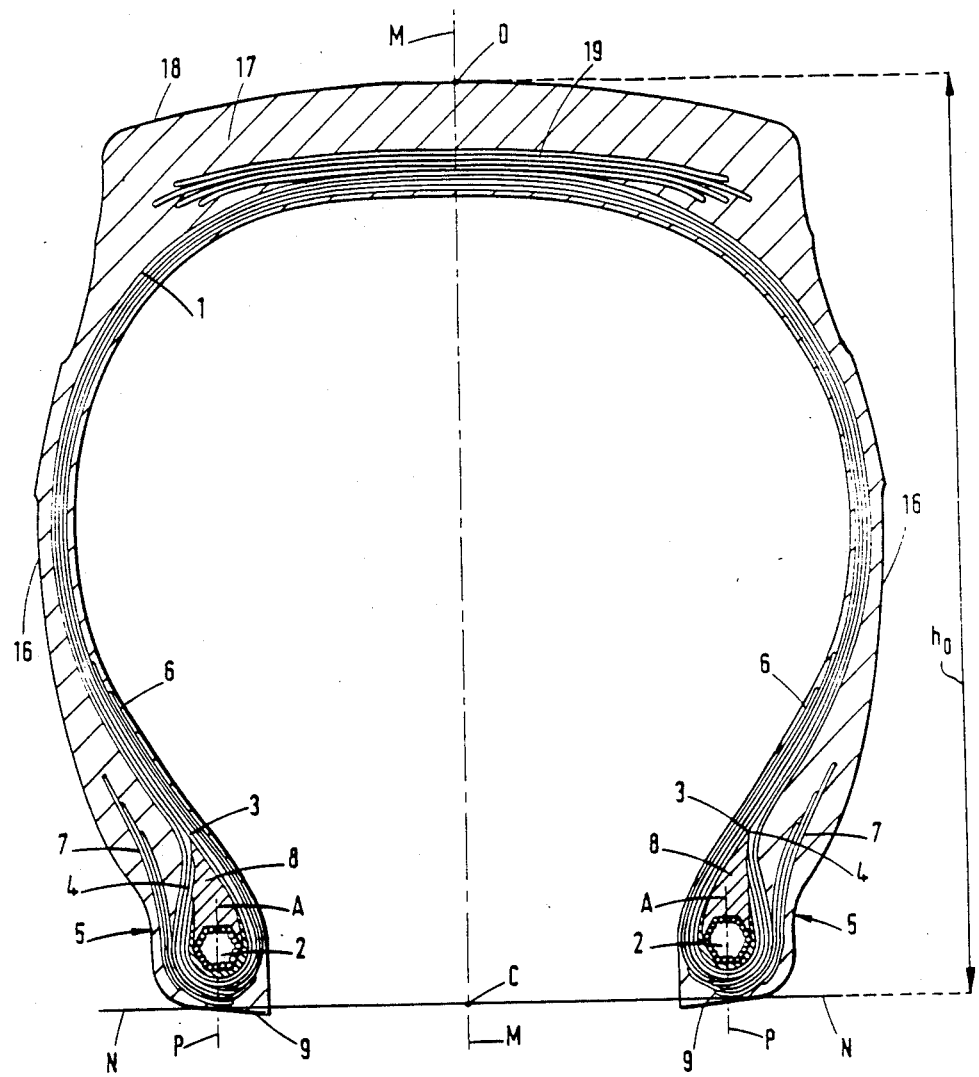
FIG. 1 is a radial cross-sectional view of the tire of the present invention.
Figure 2:
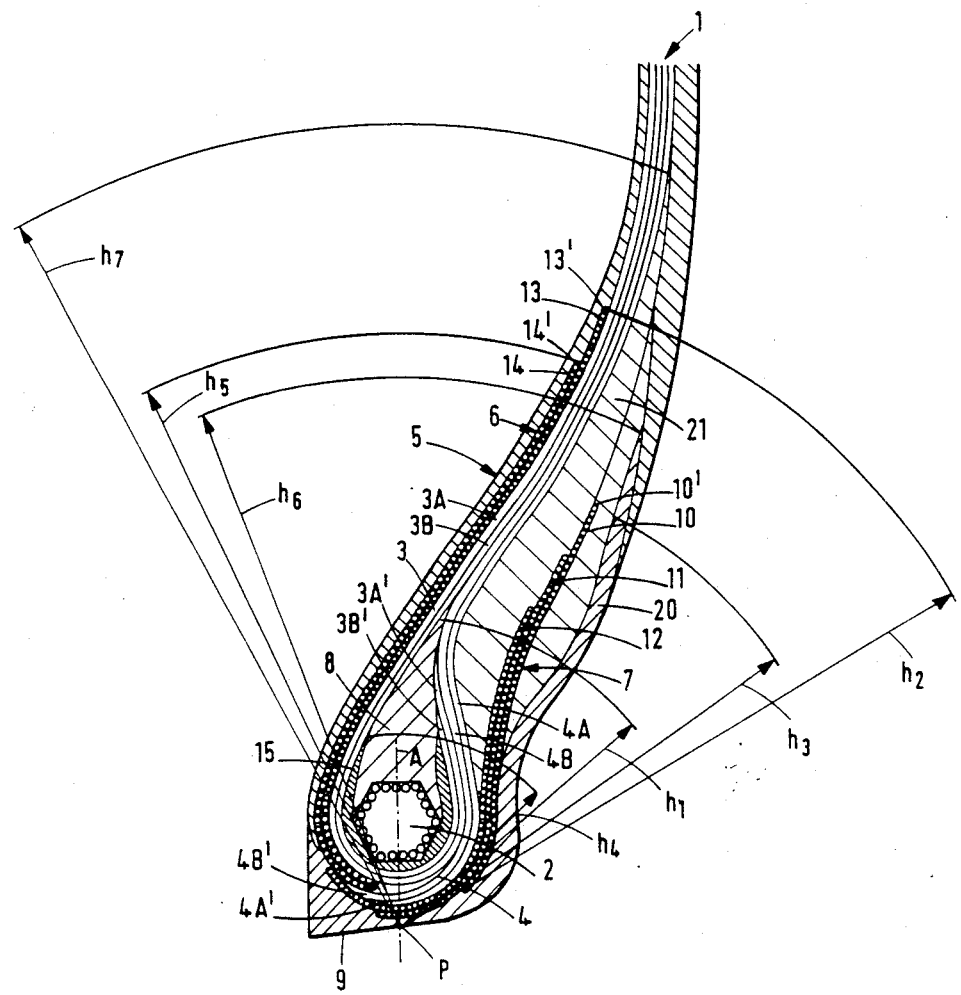
FIG. 2 is an enlarged radial cross-sectional view of a bead region of the tire of FIG. 1.

With reference to FIG. 1 and FIG. 2, there is illustrated a cross-section through a radial carcass tire for heavy duty use for mounting on a flat base wheel rim. The tire comprises a pair of annular bead regions 5 for engaging with the bead seats and flanges of a wheel rim. Both bead regions 5 are of identical construction and therefore only one of the bead regions 5 will be described. The bead region 5 comprises a substantially inextensible annular bead core 2, an axially inner 6 and an axially outer 7 textile reinforcing layer and a rubber apex strip 8 of a substantially triangular cross-section extending radially outwardly from the bead core 2. The bead core 2 as shown in the embodiment of FIGS. 1 and 2 consists of metal cords which are disposed in a ring having a generally hexagonal cross-section. The invention is not limited to the use of such bead cores and is equally applicable to bead cores of a different construction and cross-section.

A sidewall 16 extends radially outwardly from each bead region 5 into a crown region 17 of the tire. The crown region 17 has a ground contacting tread 18 extending circumferentially thereabout. The tire is further reinforced in the crown region 17 by an annular belt structure 19 disposed radially outwardly of the carcass 1.

The carcass 1 may comprise two sets of at least two textile plies each, extending between the bead cores 2, the plies 3A,3B of the first set 3 being wrapped around the bead core 2 from the inside to the outside of the tire and the plies 4A,4B of the second set 4 being wrapped around the bead core 2 from the outside to the inside of the tire. As used herein, the "inside" of a tire is a surface that defines an air chamber, and the "outside" is the opposing surface.

The material for the textile plies of the carcass may be selected from one or more of the conventional materials that are used in tires, such as polyester, nylon, rayon, etc. Applicants have found that polyester is a particularly suitable material for the first 3 and second 4 sets of carcass plies.

In the embodiment shown, the carcass plies 4A,4B of the second set 4 are disposed axially outwardly of the carcass plies 3A,3B of the first set 3 and the end portions of the carcass plies 4A,4B of the second set 4 enclose the end portions of the carcass plies 3A,3B of the first set 3.

Referring now more particularly to FIG. 2, it can be seen that the ply endings 3A',3B' of the first set 3 of carcass plies are located at a height which is lower than the height $h_1$ of the radially outermost end of the rubber apex strip 8, while the ply endings 4A',4B' of the second set 4 of carcass plies are located at a height which is lower than the height of the radially innermost edge of the bead core 2.

Throughout this specification, by "height" of a structural component is meant the straight line distance of the component from a reference point P which is located at the intersection of (a) a plane A which is perpendicular to the tire's axis of rotation and passes through the center of the respective bead core 2 and (b) the radially inner surface 9 of the bead region 5.

The height of the tire cross-section $h_0$, as shown on FIG. 1, is measured as the radial distance from a point C, which is located at the intersection of a mid-circumferential plane M—M and a plane N—N which connects the two reference points P, to a point D which is the radially outermost point of the tread surface on the mid-circumferential plane M—M.

The lower portion of the sidewall is reinforced and rigidified by axially inner 6 and axially outer 7 textile reinforcing layers. The axially inner textile reinforcing layer 6 comprises at least two plies 13,14. In the embodiment shown, the two plies 13,14 are staggered and are arranged to terminate successively radially outwardly further as each ply 13,14 is located axially closer to the carcass 1. The invention, however, is not limited to this configuration and equally applies to tires in which the reverse arrangement of the plies 13,14 is used. In the reverse arrangement of the plies 13,14, the plies 13,14 terminate successively radially outwardly further as each ply 13,14 is located axially further away from the carcass 1. The height $h_2$ of the radially outermost edge of the axially inner textile reinforcing layer 6 is located between 0.25 and 0.45 times the height $h_0$ of the tire cross-section.

The axially outer textile reinforcing layer 7 consists of at last two plies. In the embodiment shown there is illustrated an axially outer textile reinforcing layer 7 comprising three plies 10,11,12 which are staggered and are arranged to terminate successively radially outwardly further as each ply 10,11,12 is located further away from the carcass 1. Similarly to what has been described above in connection with the axially inner textile reinforcing layer, the invention is not limited to this configuration of the plies 10,11,12 and equally applies to tires in which the reverse arrangement of the plies 10,11,12 is used. As outlined in the introduction to the specification, it is essential that the textile reinforcing layer plies are arranged such that a gradual decrease of the stiffness of the tire from the bead core towards the mid-sidewall is accomplished. This is achieved by the staggering of the plies as described above, combined with the fact that the height $h_5$ of the radially outermost edge 14' of the ply 14 of the axially inner textile reinforcing layer 6 that terminates radially closest to the axis of the tire is greater than the height $h_3$ of the radially outermost edge 10' of the ply 10 of the axially outer textile reinforcing layer 7 that terminates radially outwardly furthest from the axis of the tire. The height $h_3$ of the radially outermost edge of the axially outer textile reinforcing layer 7 is located between 0.2 and 0.35 times the height $h_0$ of the tire cross-section.

The bead region 5 of the tire further comprises an apex strip 8 of a generally triangular cross section extending radially outwardly from the bead core towards the sidewall of the tire. More specifically, the height $h_1$ of the radially outermost end of the rubber apex strip 8 is located between 0.15 and 0.2 times the height $h_0$ of the tire cross-section. The rubber apex strip 8 generally consists of a rubber compound with a Shore A hardness in the range of between 70° and 90°.

The bead region 5 further comprises an additional rubber reinforcing layer 15, generally referred to in the tire art as a flipper, which is wrapped partially around the bead core 2 and is located between the bead core 2 and the first set of carcass plies 3. The radially outermost edge of the rubber reinforcing layer 15 is located at a height $h_4$ which is less than 0.15 times the height $h_0$ of the tire cross-section.

As illustrated in FIG. 2 the bead region 5 of the tire further comprises an additional rubber layer 20, generally referred to as chafer, which is located on the axially outer side of the bead region 5, generally referred to as the heel of the bead region 5. This rubber layer 20, which preferably consists of a compound having a Shore A hardness in the range of between 70° and 90°, increases the rigidity of this portion of the bead and protects it from the chafing action that might take place between the heel of the bead region 5 and the flange of the rim upon which the tire is mounted. In a preferred embodiment of the invention, the rubber reinforcing layer 20 extends from the reference point P to a height $h_6$ which is located between the height $h_5$ of the radially outermost edge 14' of the ply 14 of the axially inner textile reinforcing layer 6 that terminates radially closest to the axis of the tire and the height $h_3$ of the radially outermost edge 10' of the ply 10 of the axially outer textile reinforcing layer 7 that terminates radially outwardly furthest from the axis of the tire. This disposition of the rubber layer 20 further enhances the stiffness gradient in the lower portion of the sidewall of the tire.

There is disposed in the bead region 5 an additional rubber strip 21 which is located adjacent to the rubber apex strip 8 and interposed between the second set 4 of carcass plies and the rubber reinforcing layer 20, and which extends radially outwardly to a height $h_7$ which is smaller than 0.5 times the height $h_0$ of the tire cross-section. This rubber strip 21 preferably has a Shore A hardness in the range of between 55° and 65°.

The present invention has been described with reference to a carcass comprising two sets of two textile plies each. The invention is not limited to such a carcass and is equally applicable to a carcass comprising two sets of textile plies comprised of more than two plies each. It is well known in the tire art that the number of plies that are used as carcass plies depends upon the size of a tire and the load that the tire must be capable of carrying.

Similarly the number of plies that comprise the inner and outer textile reinforcing layers is dependent on the size and load capacity of the tire.

Figure 3:
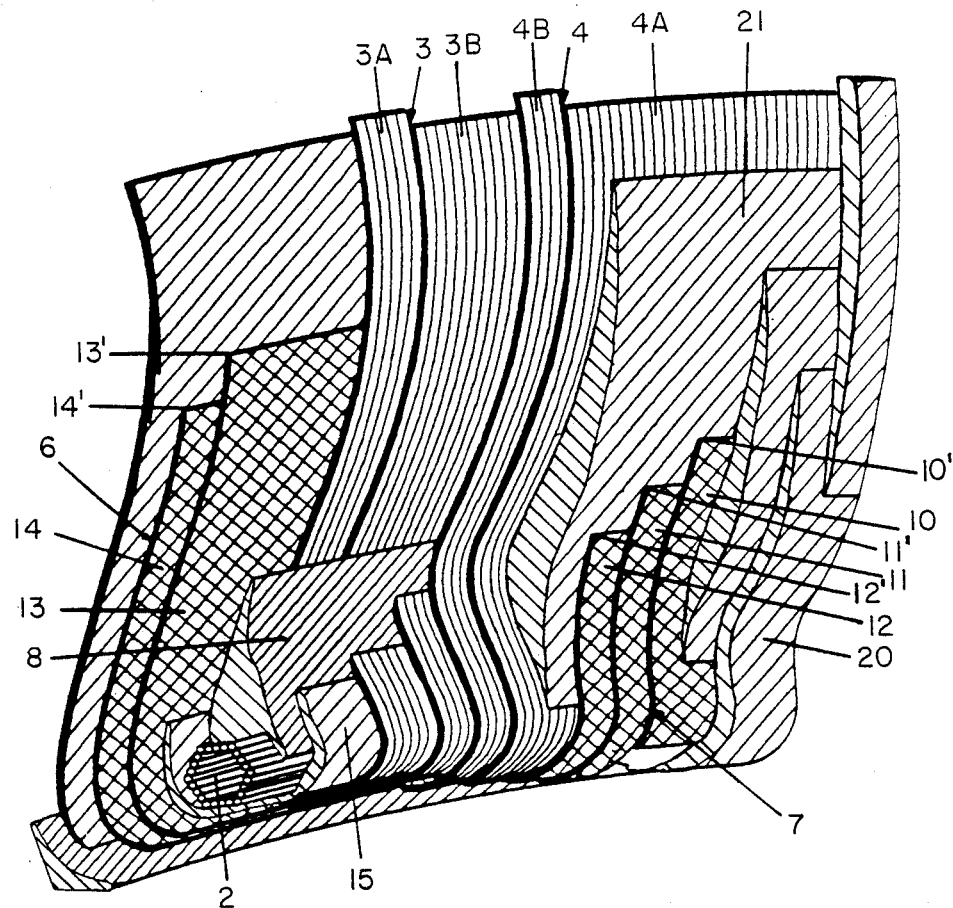
FIG. 3 is a schematic side view of a bead region of the preferred embodiment of a tire according to the present invention.

FIG. 3 shows a schematic side view of a bead region of the preferred embodiment of a tire according to the present invention. In this preferred embodiment the axially inner 6 and axially outer 7 textile reinforcing layers are composed of a square woven fabric, the angle which the cords of the square woven fabric make with the mid-circumferential plane M—M being in the range of 30 degrees and 60 degrees. Preferably the angle is 45 degrees.

"Square woven fabric" as described throughout the present specification refers to a plurality of textile cords that are interwoven or knit such that a first portion of the textile cords extend parallel to one another in a first direction while the remainder of the textile cords extend parallel to one another in a second direction that is substantially perpendicular to the first direction. As used herein, and in the claims, "interwoven" refers to fabric produced by interlacing two cords so that they cross each other at right angles, and "knit" refers to fabric produced by interlocking a series of loops of one or more cords. As used herein, and in the claims, "textile cords" refers to any fiber, filament or yarn of the type used for reinforcing tires. The textile cords of the square woven fabric used in practicing this invention are preferably nylon, but may be polyester or any other suitable material selected in accordance with good engineering practice.

It is claimed:
1. A pneumatic tire for heavy duty use comprising:
two bead regions, each reinforced by a bead core:
a radial carcass having two sets of at least two textile plies each, anchored around the bead core, the plies of the first set being wrapped around the bead core from the inside towards the outside of the tire and the plies of the second set being wrapped around the bead core from the outside towards the inside of the tire;
each bead region comprising a rubber apex strip of a substantially triangular cross-section extending radially outwardly from the bead core and an axially inner and an axially outer textile reinforcing layer comprising a square woven fabric having textile cords oriented at an angle with respect to the mid-circumferential plane in the range of 30 degrees to 60 degrees, and the axially inner and axially outer textile reinforcing layers being respectfully disposed axially inside and outside of the first and second sets of carcass plies along the radial extent of the rubber apex strip, said first and second sets of carcass plies being separated from one another only below a separation point at the apex of the rubber apex strip; wherein the rubber apex strip has a radially outermost end having a height $h_1$ between 0.15 and 0.2 times the height $h_0$ of the tire cross-section; wherein the first set of plies have ply endings located at a height which is lower than the height of the radially outermost end of the rubber apex strip; wherein the axially outer textile reinforcing layer has a radially outermost edge having a height $h_3$ located between 0.2 and 0.35 times the height $h_0$ of the tire cross-section; and wherein the axially inner textile reinforcing layer has a radially outermost edge having a height $h_2$ which is higher than $h_3$ and between 0.25 and 0.45 times the height $h_0$.

2. A pneumatic tire for heavy duty use according to claim 1 wherein the height $h_5$ of a radially outermost edge of a ply of the axially inner textile reinforcing layer that terminates radially closest to the axis of the tire is greater than the height $h_3$ of the radially outermost edge of a ply of the axially outer textile reinforcing layer that terminates radially outwardly furthest from the axis of the tire.

3. A pneumatic tire for heavy duty use according to claim 2 wherein the angle which the cords of the square woven fabric make with the mid-circumferential plane is 45 degrees.

4. A pneumatic tire according to claim 3 wherein the axially outer textile reinforcing layer comprises at least two staggered plies arranged to terminate successively radially outwardly further as each ply is located axially further away from the carcass.

5. A pneumatic tire according to claim 3 wherein the axially outer textile reinforcing layer comprises at least two staggered plies arranged to terminate successively radially outwardly further as each ply is located axially closer to the carcass.

6. A pneumatic tire according to claim 4 or 5 wherein the axially inner textile reinforcing layer comprises at least two staggered plies arranged to terminate successively radially outwardly further as each ply is located axially closer to the carcass.

7. A pneumatic tire for heavy duty use according to claim 4 or 5 wherein the axially inner textile reinforcing layer comprises at least two staggered plies arranged to terminate successively radially outwardly further as each ply is located axially further away from the carcass.

8. A pneumatic tire for heavy duty use according to claim 6 further comprising an additional rubber reinforcing layer, wrapped around the bead core and located between the bead core and the first set of carcass plies, and having radially outermost edges, of a height $h_4$, being located less than 0.15 times the height $h_0$ of the tire cross-section.

9. A pneumatic tire for heavy duty use according to claim 8 wherein it comprises a rubber layer of a Shore A hardness in the range of between 70 degrees and 90 degrees which is located on an axially outermost side of the bead region and extends to a height $h_6$ which is between the height $h_5$ of the radially outermost edge of the ply of the axially inner textile reinforcing layer that terminates radially closest to the axis of the tire and the height $h_3$ of the radially outermost edge of the ply of the axially outer textile reinforcing layer that terminates radially outwardly furthest from the axis of the tire.

10. A pneumatic tire for heavy duty use according to claim 9 wherein the square woven fabric is comprised of interwoven nylon cords.

11. A pneumatic tire for heavy duty use according to claim 9 wherein the square woven fabric is comprised of knit nylon cords.

12. A pneumatic tire according to claim 7 further comprising an additional rubber reinforcing layer, wrapped around the bead core and located between the bead core and the first set of carcass plies, and having radially outermost edges, of a height $h_4$, being located less than 0.15 times the height $h_0$ of the tire cross-section.

13. A pneumatic tire according to claim 12 wherein it comprises a rubber layer of a Shore A hardness in the range of between 70 degrees and 90 degrees which is located on an axially outermost side of the bead region and extends to a height $h_6$ which is between the height $h_5$ of the radially outermost edge of the ply of the axially inner textile reinforcing layer that terminates radially closest to the axis of the tire and the height $h_3$ of the radially outermost edge of the ply of the axially outer textile reinforcing layer that terminates radially outwardly furthest from the axis of the tire.

14. A pneumatic tire according to claim 13 wherein the square woven fabric comprises interwoven nylon cords.

15. A pneumatic tire according to claim 14 wherein the square woven fabric comprises knit nylon cords.

* * * * *